(12) United States Patent
Melentijevic

(10) Patent No.: US 12,259,642 B2
(45) Date of Patent: Mar. 25, 2025

(54) SYSTEMS AND METHODS FOR MAGNETIC ATTACHMENT OF OPTICAL FILTERS

(71) Applicant: Ilija Melentijevic, Somerset, NJ (US)

(72) Inventor: Ilija Melentijevic, Somerset, NJ (US)

(73) Assignee: Kolari Vision LLC, Raritan, NJ (US)

( * ) Notice: Subject to any disclaimer, the term of this patent is extended or adjusted under 35 U.S.C. 154(b) by 187 days.

(21) Appl. No.: 18/129,189

(22) Filed: Mar. 31, 2023

(65) Prior Publication Data

US 2023/0314912 A1    Oct. 5, 2023

Related U.S. Application Data

(60) Provisional application No. 63/325,704, filed on Mar. 31, 2022.

(51) Int. Cl.
*G03B 17/12*    (2021.01)
*G02B 7/00*    (2021.01)

(52) U.S. Cl.
CPC ............. *G03B 17/12* (2013.01); *G02B 7/006* (2013.01)

(58) Field of Classification Search
CPC ...... G03B 11/00–041; G03B 17/12–14; G02B 7/006
See application file for complete search history.

(56) References Cited

U.S. PATENT DOCUMENTS

| | | | |
|---|---|---|---|
| 8,073,324 B2 * | 12/2011 | Tsai | H01F 7/0247 |
| | | | 359/827 |
| 10,678,120 B1 * | 6/2020 | Lozano-Buhl | H01F 7/02 |
| 11,022,773 B2 * | 6/2021 | Clark | G03B 11/00 |
| 11,194,114 B2 * | 12/2021 | Leung | G03B 17/565 |
| 11,846,824 B2 * | 12/2023 | Gwalani | G02B 5/205 |
| 2013/0089315 A1 | 4/2013 | Yang | |
| 2015/0355431 A1 | 12/2015 | Garvey et al. | |

* cited by examiner

*Primary Examiner* — Leon W Rhodes, Jr.
(74) *Attorney, Agent, or Firm* — Andrus Intellectual Property Law, LLP

(57) ABSTRACT

An optical filter attachment assembly for a camera is provided. The optical filter attachment assembly includes an attachment assembly configured to be threadably coupled to the camera and having an attachment frame. The attachment frame includes a first set of magnets. The optical filter attachment assembly further includes at least one filter assembly. Each filter assembly includes at least one optical filter mounted in a filter frame. The filter frame includes a second set of magnets. The first set of magnets and the second set of magnets are configured to detachably couple to each other such that the at least one optical filter is retained on the camera.

18 Claims, 9 Drawing Sheets

SYSTEMS AND METHODS FOR MAGNETIC ATTACHMENT OF OPTICAL FILTERS

CROSS REFERENCE TO RELATED APPLICATION

This application claims priority to U.S. Provisional Application No. 63/325,704, filed Mar. 31, 2023, which is incorporated herein by reference in its entirety.

FIELD

The present disclosure relates to mounting optical components, and more particularly, pertains to mounting optical filters to cameras using an adapter that utilizes magnetic coupling.

BACKGROUND

The following U.S. Patents provide background information.

U.S. Pat. No. 2,953,970 discloses a mount for supporting an optical element with respect to a barrel ring of an optical system, said mount comprising in combination: A magnetically permeable portion, and a permanently magnetic portion; said permanently magnetic portion comprising an annular ceramic permanent magnet having an annular pattern of permanent magetization substantially coaxial with said barrel ring and with magnetic poles extending in both axial directions; and an optical element retainer ring assembly adapted to support the optical element, and having a continuous coaxial surface of revolution engageable in an axial direction with said system and disposed substantially coaxially with said barrel ring, said optical element retainer ring assembly rigidly incorporating one of said portions; one end of said magnetic portion terminating substantially in said surface of revolution for acting magnetically directly in an axial direction on said magnetically permeable portion to support said retainer ring assembly, and said optical element retainer ring assembly being selectably rotatable about its axis to any angular position with respect to the barrel ring.

U.S. Pat. No. 8,238,742 discloses a coupling system and method for removably mounting filters to a photographic camera lens. The coupling system includes a lens coupling element and filter coupling element. The lens coupling element and filter coupling element have magnetically attractive and telescopically aligning portions. The forward end of the filter coupling element operably supports a filter material.

U.S. Pat. No. 9,042,719 discloses devices and system to magnetically, rotably secure a lens filter to a camera. Generally the devices and systems comprise a magnet assembly and a lens filter assembly threadably engageable. Also provided are magnetic lens filter systems comprising the engaged magnet and lens filter assemblies and an attachment assembly securable around a camera lens and magnetically attachable to the magnet comprising the magnetic lens filter, magnetic adapter assembly or magnetic adapter. Further provided are camera systems comprising the magnetic lens filter systems rotatably affixed thereto.

U.S. Pat. No. 9,709,769 discloses methods for optically aligning components of a light collection system. Methods according to certain embodiments include coupling a connector having a first lens to an optical adjustment component having a second lens by connecting a first magnet and first aligner positioned on the connector to a second magnet and second aligner positioned on the optical adjustment component such that connecting the first magnet and first aligner to the second magnet and second aligner is sufficient to position the connector lens to be optically concentric with the optical adjustment component lens. Light collection systems optically aligned by the subject methods including flow cell nozzles optically aligned with an optical adjustment component are also described. Systems and methods for measuring light emitted by a sample (e.g., in a flow stream) are also provided.

U.S. Patent Publication No. 2013/0089315 discloses a filter module for connecting to a lens barrel of an image capturing module is disclosed. The filter module includes a filter, a frame and magnetic unit. The filter is for passing through a light beam with a specific wavelength. The frame is arranged around the filter. The magnetic unit is arranged on the frame for magnetic connecting the frame to the lens barrel. In addition, the present invention also disclosed a photographing apparatus having the above-mentioned filter module.

U.S. Patent Publication No. 2015/0355431 discloses a mounting system for mounting an optical element to a supporting unit of an optical system that may include several optical elements in a predetermined alignment with respect to one another and with respect to an optical axis. A carrier holding an optical element in a known position and orientation with respect to the carrier is attached to a supporting unit in a selected location and position of rotation, with respect to an axis that may be the optical axis, by a plurality of magnetic elements, ones of which are carried in or affixed to the supporting unit in predetermined locations and orientations, and other ones of which are included in or affixed to the carrier in predetermined locations and orientations that result in mutual attraction between corresponding ones of the magnetic elements when the carrier is in a predetermined position with respect to the supporting unit. The numbers and locations of the magnets in the supporting unit may provide for a plurality of possible predetermined positions in which mutual magnetic attraction fastens the carrier to the supporting unit.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter.

According to one example of the present disclosure, an optical filter attachment assembly for a camera is provided. The optical filter attachment assembly includes an attachment assembly configured to be threadably coupled to the camera and comprising an attachment frame. The attachment frame includes a first plurality of magnets. The optical filter attachment assembly further includes at least one filter assembly having at least one optical filter mounted in a filter frame. The filter frame comprises a second plurality of magnets, and the first plurality of magnets and the second plurality of magnets are configured to detachably couple to each other such that the at least one optical filter is retained on the camera.

According to another example of the present disclosure, a filter assembly used in an optical filter attachment assembly for a camera is provided. The filter assembly includes a filter frame, at least one optical filter mounted in the filter frame, and a first plurality of magnets mounted in a first pattern in the filter frame. The first plurality of magnets are configured to detachably couple to a second plurality of magnets mounted in an attachment assembly that is threadably coupled to the camera.

BRIEF DESCRIPTION OF THE DRAWINGS

The present disclosure is described with reference to the following Figures. The same numbers are used throughout the Figures to reference like features and like components.

DETAILED DESCRIPTION

Figure 1:
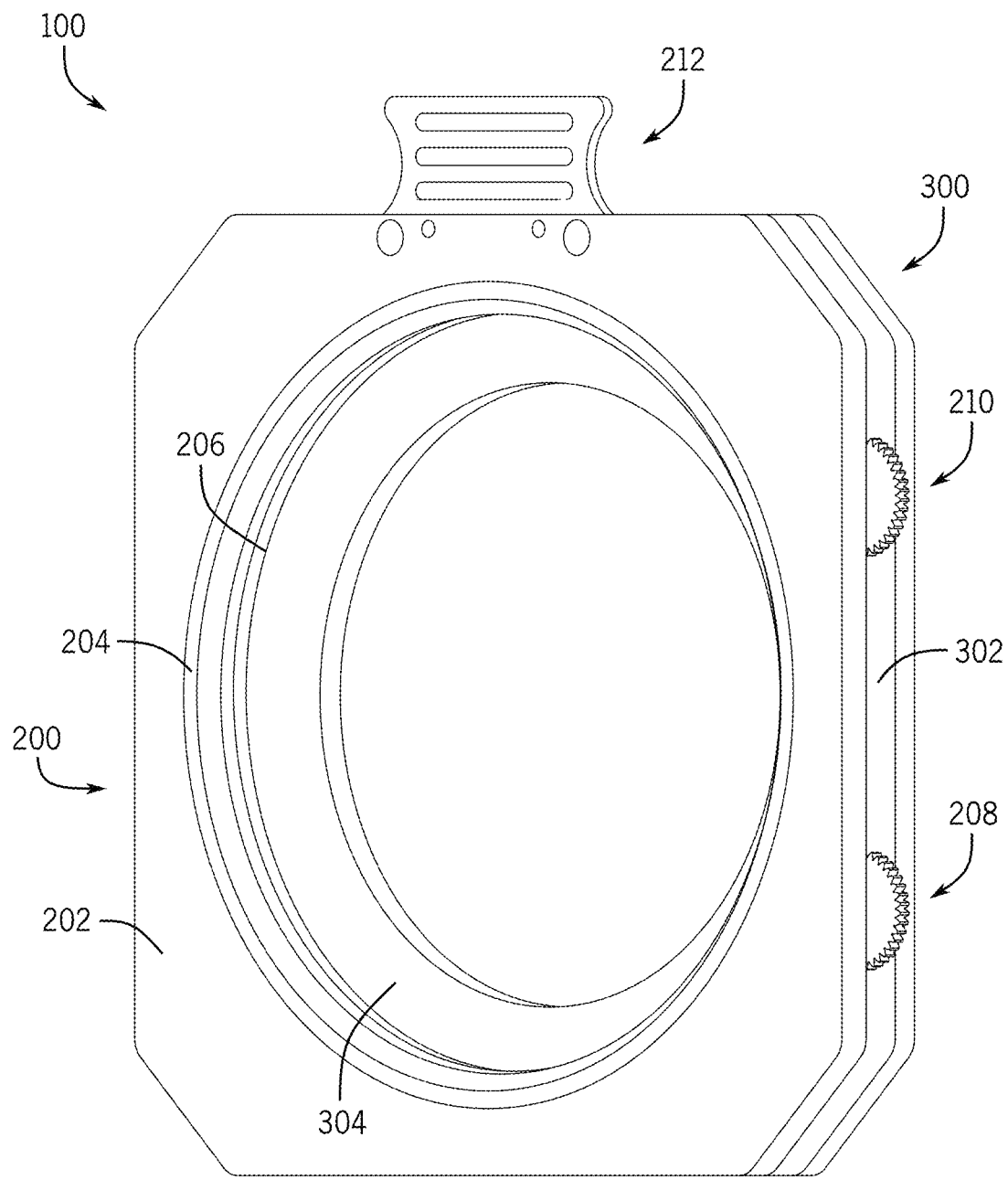
FIG. 1 is a front perspective view of a magnetic filter attachment assembly according to an exemplary implementation of the present disclosure.
Figure 2:
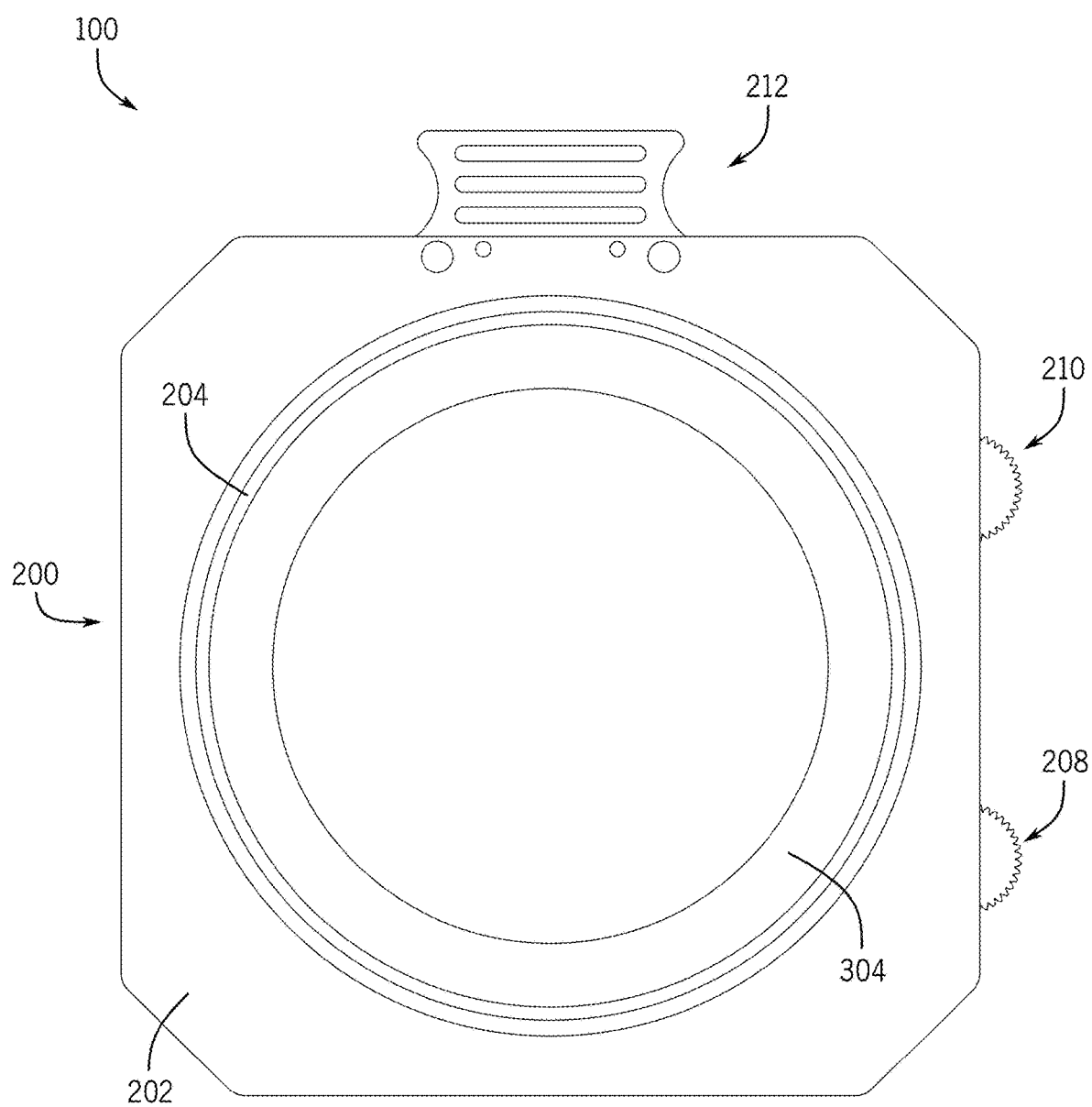
FIG. 2 is a front view of the magnetic filter attachment assembly of FIG. 1.

In the present description, certain terms have been used for brevity, clarity, and understanding. No unnecessary limitations are to be inferred therefrom beyond the requirement of the prior art because such terms are used for descriptive purposes only and are intended to be broadly construed.

Professional and hobbyist photographers utilize multiple types of optical filters to achieve desired image results. These optical filters may include polarizing filters or polarizers, protective filters, special-effects filters, graduated filters, black-and-white contrast filters, color-conversion filters, fluorescent filters, and neutral density filters. Typically, optical filters are positioned in front of a camera lens and attached to the camera using a threaded connection. However, the present inventor has recognized that the threaded connection of optical filters to lenses presents several disadvantages. Filters with threaded connections can be time consuming and difficult to install, and damage to the threads of either the filter or the lens may prevent assembly. The threaded connections may also bind to each other once installed, making filter removal difficult or impossible. Since the focus point of a lens assembly may be modified via a twisting motion, applying a twisting motion to a threaded filter to attach or detach it from the lens assembly may have the unwelcome effect of modifying the focus point. This is particularly troublesome in applications that require both a set focus point and switching of filters (e.g., during use of a focus assist filter while photographing stars.) An improved system and method for quickly and easily attaching one or more filters to a camera lens without use of a threaded connection would therefore be useful.

FIGS. 1-8 depict a magnetic filter attachment assembly 100 according to an exemplary implementation of the present disclosure. The assembly 100 is shown to include two subassemblies: a magnetic filter assembly 200 and an attachment assembly 300. As described in further detail below, each of the filter assembly 200 and the attachment assembly 300 may include multiple discrete magnets that permit the filter assembly 200 to quickly couple and decouple from the attachment assembly 300. The attachment assembly 300 utilizes an existing threaded connection on a camera for an optical filter to remain coupled to the camera (not shown). In this way, a user can easily install one or more optical filters on the camera lens by simply bringing the discrete magnets of the filter assembly 200 (see magnets 214, specifically depicted in FIGS. 5 and 6) in the vicinity of the discrete magnets of the attachment assembly 300 (see magnets 306, specifically depicted in FIG. 8). When removal is desired, a user can simply pull the filter assembly 200 away from the attachment assembly 300 until the subassemblies are separated.

The magnetic filter assembly 200 includes a filter frame 202 that is configured to retain up to two separate optical filters 204, 206. The optical filters 204, 206 may be secured within the filter frame 202 using snap fit features or a threaded retaining ring. In other implementations, the optical filters 204, 206 may be secured to one or more components of the filter frame 202 using an adhesive. In further exemplary implementations, the optical filters 204, 206 may be mounted within frames having external teeth configured to engage with spur gears 208, 210, as described in further detail below.

In an exemplary implementation, the filter frame 202 is fabricated from aluminum, although in other implementations a different material (e.g., plastic, non-ferrous metal) may be utilized. The filter frame 202 is shown to have a generally square or rectangular outer perimeter, and the dimensions of the frame 202 may be determined by the size of the optical filters 204, 206, and/or the size of the camera lens. For example, for the implementation depicted in FIGS. 1-7, the filter frame 202 is configured to accommodate optical filters 204, 206 that have a maximum diameter of 92 mm. Accordingly, as specifically depicted in FIG. 6, the filter frame 202 may have a maximum width 218 of approximately 112 mm and a maximum height 220 of approximately 113 mm. As specifically depicted in FIG. 7, the filter frame 202 have a maximum depth 234 of approximately 6 mm. As described in further detail below, the height 220 of the frame 202 may be slightly larger than the width 218 to accommodate the attachment of a filter identification tab 212. Each of the corners of the filter frame 202 is further shown to include chamfers. In this way, the filter frame 202 does not include any sharp edges that could pose a safety hazard, and the chamfered corners further provide convenient surfaces for a user to grasp during coupling or decoupling the filter assembly 200 from the attachment assembly 300.

Optical filters 204, 206 may be any desired type of filter and may be fabricated from any desired material (e.g., glass). The present inventor has recognized that the arrangement disclosed herein is particularly useful for variable neutral density (VND) filters, which utilize two polarizers (e.g., 204, 206) that are rotated relative to each other to adjust darkening levels. Our planned configurations are variable neutral density filters at a range of densities, as well as a combination VND+polarizer filter. The use of two filters or optical components 204, 206 within a single frame 202 may also be advantageous to combine common effects into a single assembly. For example, photographers sometimes want a dark CPL filter (neutral density+circular polarizer). Although such an effect is normally achieved by adding two coatings to the same piece of glass, according to the present invention this effect can be achieved by using two separate pieces of glass in the form of components 204, 206, which would increase production efficiency and permit mixing and matching of glass pieces depending on current demand. Although FIGS. 1-6 depict the magnetic filter assembly 200 as containing two separate filters 204, 206, in other implementations, each magnetic filter assembly 200 may include only a single filter. In some embodiments, a rotational position of the optical filter 204, 206 relative to the camera lens affects or dictates the performance of the filters 204, 206. For example, if one or both of the filters 204, 206 is a polarizer, the angle of rotation dictates the angle of polarization and thus the orientation of light that is permitted to enter the camera lens. By restricting the orientation of light that is permitted to enter the camera lens, reflections on objects can be reduced, and the brightness and/or saturation of colors can be modified.

Figure 3:
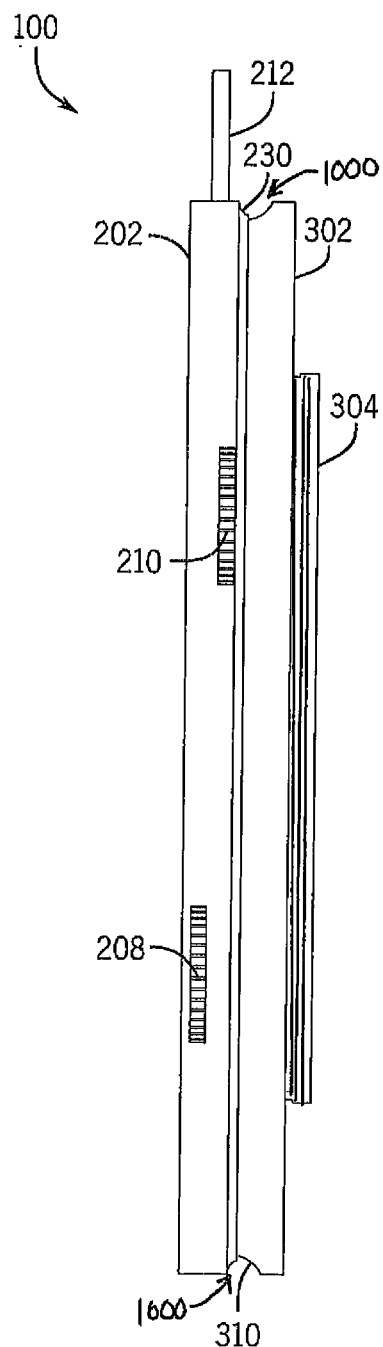
FIG. 3 is a right side view of the magnetic filter attachment assembly of FIG. 1.
Figure 4:
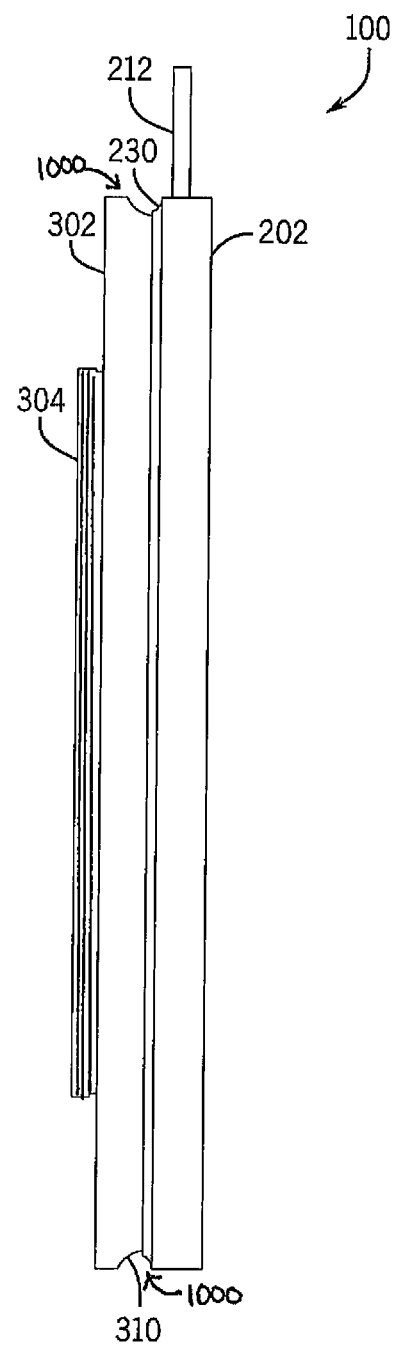
FIG. 4 is a left side view of the magnetic filter attachment assembly of FIG. 1.
Figure 6:
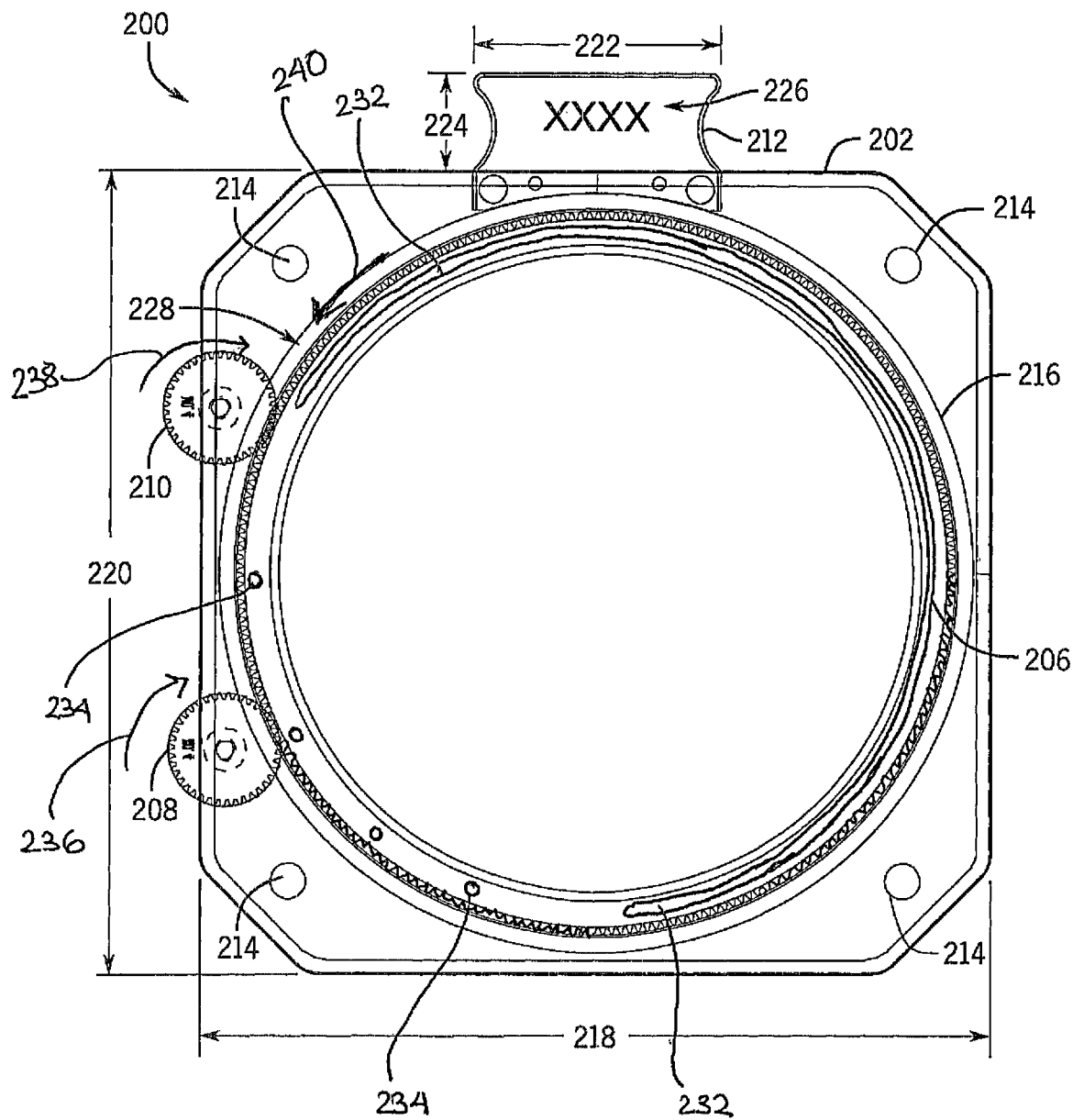
FIG. 6 is a rear view of a dual rotation magnetic filter assembly utilized in the magnetic filter attachment assembly of FIG. 1.

Rotational positions of the first optical filter 204 and the second optical filter 206 may be respectively controlled via actuatable spur gears 208, 210. In other words, rotation of the lower spur gear 208 (as indicated by arrow 236, see FIG. 6) may control rotation of optical filter 204, and rotation of the upper spur gear 210 (as indicated by arrow 238) may control rotation of optical filter 206 (as indicated by arrow 240). As best shown in FIGS. 3 and 6, the spur gears 208, 210 may be positioned to partially protrude from openings in the filter frame 202 such that a user can manually rotate each of the spur gears 208, 210. As depicted in FIG. 6, the teeth of the spur gears 208, 210 are enmeshed with external teeth 228 located on the filters 204, 206. In an exemplary implementation, the external teeth 228 extend around the entire outer perimeters of the filters 204, 206. In this way, each of the filters 204, 206 may be moved through full 360° rotations by the user via rotation of the respective spur gears 208, 210. In other embodiments, a different mechanism other than spur gears 208, 210 may be utilized to rotate one or both of the filters 204, 206.

In some implementations, the optical filters 204, 206 may be restricted from a full 360° rotation. Restriction from full 360° rotation may be particularly desirable in certain applications, for example, if the optical filters 204, 206 are arranged in a VND configuration, it is preferable to limit the range of one of the filters relative to the other to avoid causing an "X effect" that occurs with VND filters when rotation is unrestricted. Restriction may be achieved via various methods and is not particularly limited. According to one example, the filter frame 202 may include a pin component that is configured to travel within an arc-shaped channel 232 formed in the filter frame proximate the external teeth 228 of one or more of the filters 204, 206. The channel may extend less than 360° (e.g., 270°) around the filters 204, 206 such that the rotation of the filters 204, 206 is arrested once the pin component extending from the frame butts up against either end of the channel. In some embodiments, the filter frame 202 may further include spring loaded ball bearings configured to engage with one or more detent features 234 (e.g., holes, grooves) formed proximate the external teeth 228 of one or more of the filters 204, 206. The interaction of the ball bearings and the detent features 234 may provide tactile feedback to the operator while rotating one or more of the filters 204, 206. For example, the detents 234 may be spaced a certain distance (e.g., 30°) apart so that the operator is easily able to achieve a known rotation of one or more of the filters 204, 206.

Figure 11:
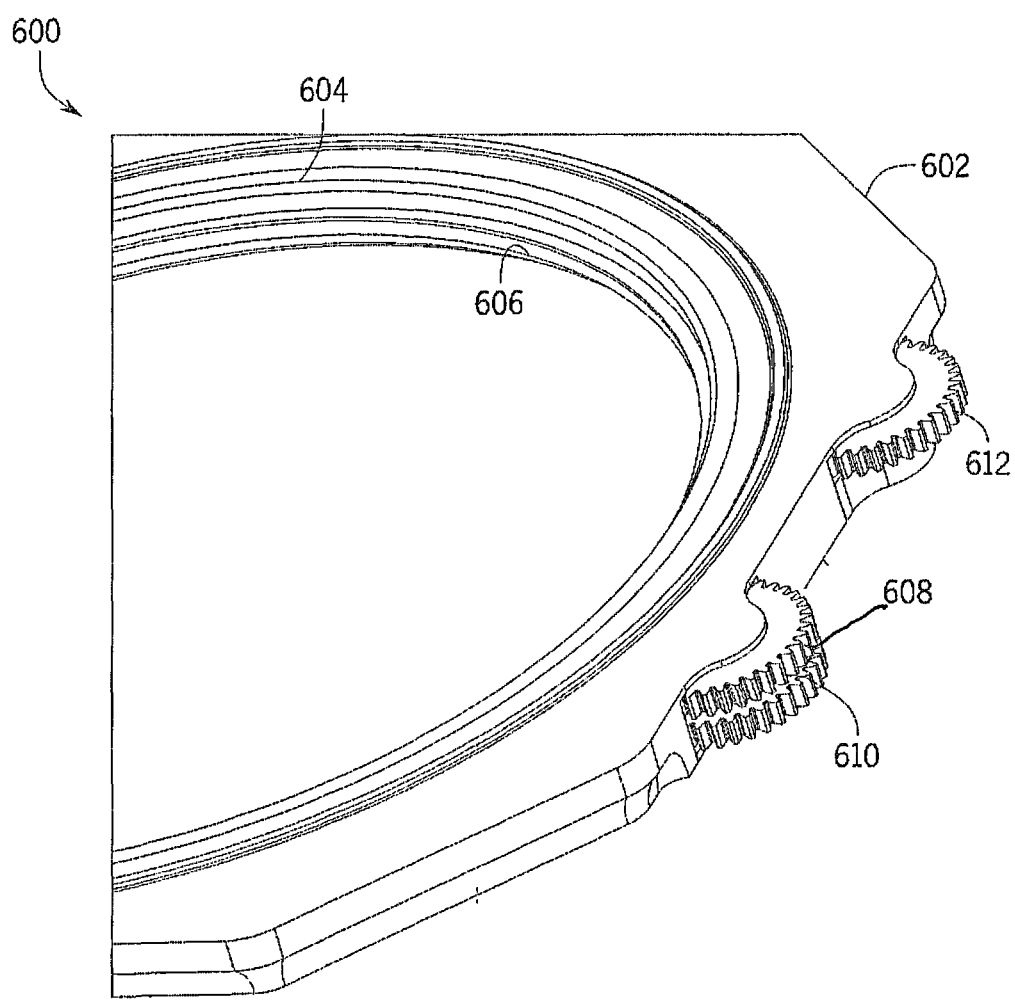
FIG. 11 is a detail perspective view of another embodiment of a dual rotation magnetic filter assembly that may be utilized in the magnetic filter attachment assembly of FIG. 1.

One implementation of a restricted rotation configuration is shown in the triple gear filter assembly 600 depicted in FIG. 11. Filter assembly 600 is shown to include optical filters 604, 606 retained within filter frame 602. Three actuatable spur gears 608, 610, 612 are provided to control rotation of the filters 604, 606. Specifically, gears 608 and 610 are configured to be rotated together with a single motion, rotating both filters 604 and 606 simultaneously. Gear 612 is provided to rotate only filter 604 (although in other implementations, gear 612 may instead be utilized to rotate only filter 606) such that filter 604 rotates relative to filter 606 through a range of rotation that is less than 360°.

Figure 5:
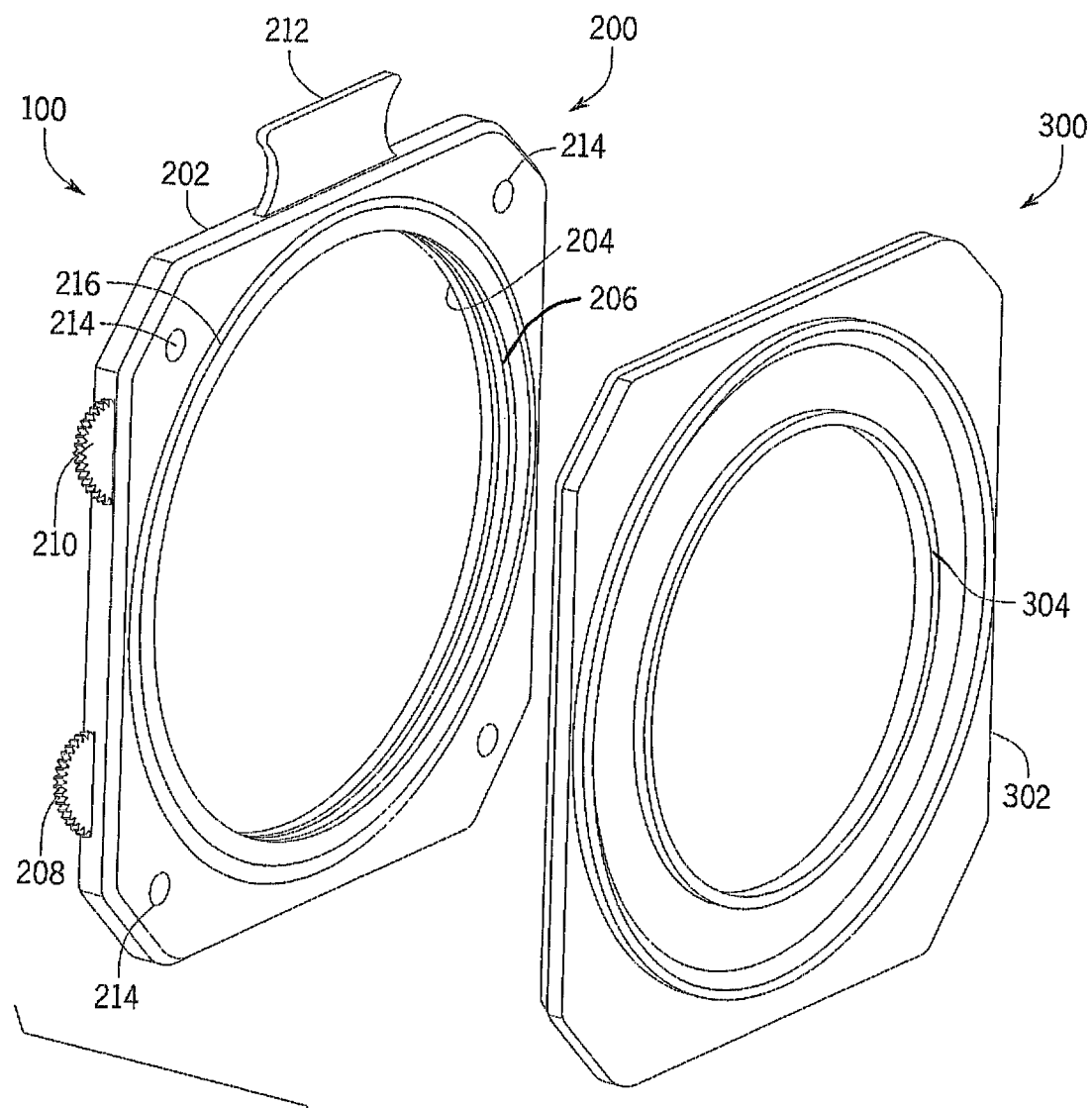
FIG. 5 is a rear perspective exploded view of the magnetic filter attachment assembly of FIG. 1.
Figure 8:
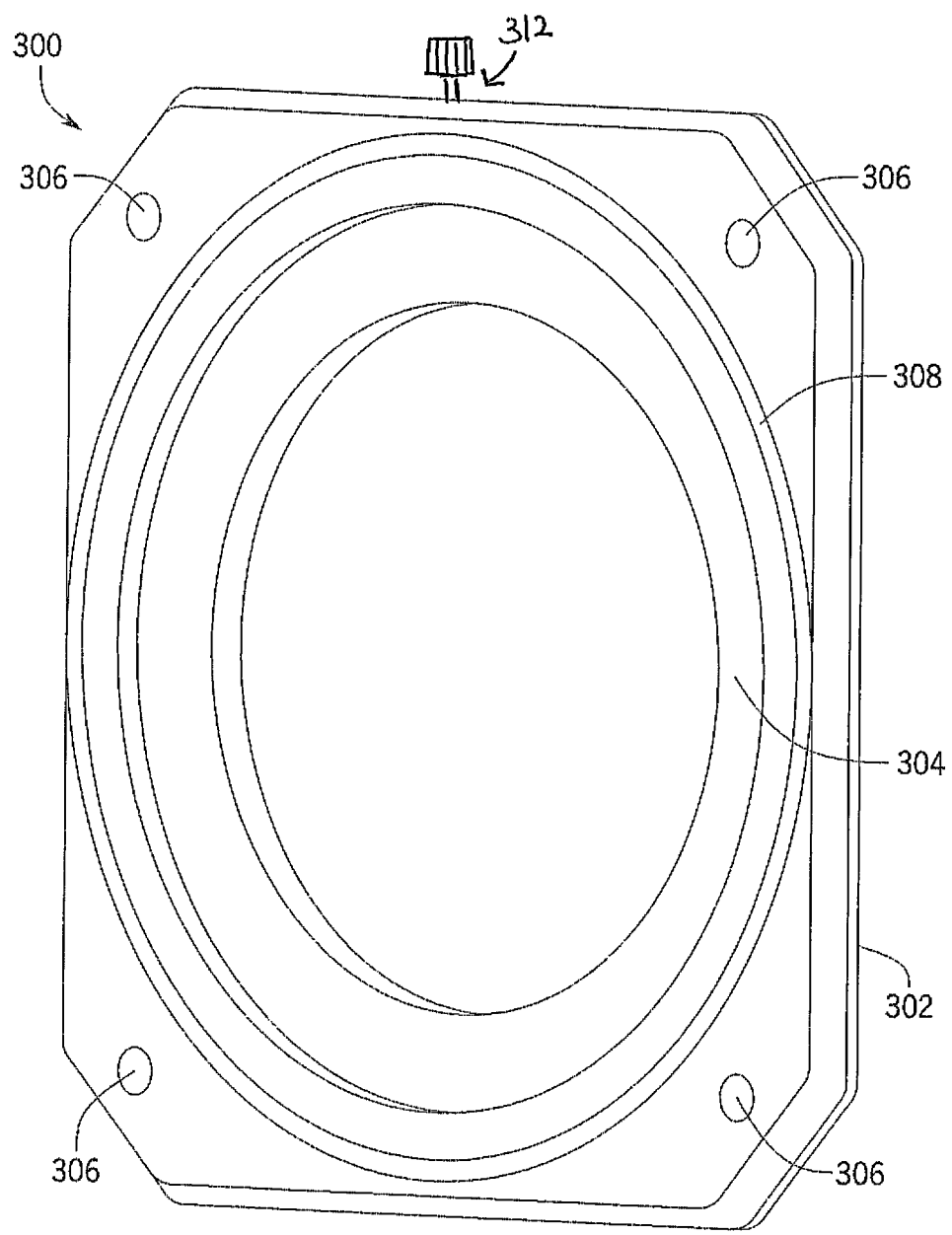
FIG. 8 is a front perspective view of an attachment assembly utilized in the magnetic filter attachment assembly of FIG. 1.

FIGS. 5 and 6 further depict the filter assembly 200 as including multiple coupling magnets 214 attached to the filter frame 202 using an adhesive or other form of mechanical fastening. In an exemplary implementation, the filter assembly 200 includes four coupling magnets 214, with a magnet 214 located in each of the corners of the filter frame 202, although in other implementations, a different number of coupling magnets 214 could be utilized, in different locations. For example, the filter assembly 200 could include two coupling magnets 214 mounted in opposing corners of the filter frame 202, or a single coupling magnet 214 shaped like a ring and mounted in a circular-shaped recess of the filter frame 202. As shown in FIG. 8, attachment frame 302 of the attachment assembly 300 likewise includes corresponding coupling magnets 306 mounted in each of the corners of the attachment frame 302 using an adhesive or other form of mechanical fastening. In an exemplary implementation, the number and locations of the coupling magnets 306 in the attachment frame 302 directly correspond to the number and locations of the coupling magnets 214 in the filter frame 202 (e.g., four coupling magnets 306 in the corners of the attachment frame 302). In other implementations, the number and locations of the coupling magnets 306 may differ from the number and locations of the coupling magnets 214.

Each of the coupling magnets 214, 305 may be a rare Earth magnet to provide sufficient attractive force, and the poles of the coupling magnets 214, 306 may be oriented in the frames 202, 302 such that the magnets 214, 306 are attracted to each other and the filter assembly 200 and attachment assembly 300 are reliably coupled to each other. In an exemplary implementation, the relative strengths of the magnets 214, 306 may be selected such that the magnets 306 of the attachment assembly 300 are substantially stronger and thus exert a stronger force on the filter assembly 200 than the magnets 214 of the filter assembly 200 exert on the attachment assembly 200. In this way, multiple filter assemblies 200 may be stacked in parallel and retained in front of the camera lens by the attachment assembly 300. Since each of the filter assemblies 200 is relatively thin (e.g., approximately 6 mm in width for the embodiment depicted in FIGS. 1-5), this stacking is easily accomplished. At the same time, the relative strengths of the coupling magnets 214, 306 permit a user to easily remove the outermost filter assembly 200 in a stacked configuration while the remaining filter assemblies 200 remain coupled to the attachment assembly 300.

The mounting orientation of the filter assembly 200 relative to the attachment assembly 300 is not particularly limited. For example, although FIGS. 1-5 depict the filter assembly 200 as coupling to the attachment assembly 300 in an orientation in which the filter identification tab 212 is positioned at the top of the filter attachment assembly 100, the filter assembly 200 may be rotated 90°, 180°, or 270° from the depicted orientation such that the filter identification tab 212 is positioned at the sides or the bottom of the filter attachment assembly 100.

Still referring to FIGS. 1-7, the filter identification tab 212 is shown to be coupled to an upper edge of the filter frame 202 using any suitable attachment mechanism (e.g., adhesives, fasteners). In an exemplary implementation, the filter identification tab 212 may provide a convenient location for a user to grasp when coupling or decoupling the magnetic filter assembly 200 to the attachment assembly 300. Accordingly, the tab 212 may include surface discontinuities (e.g., ridges, grooves) to facilitate grip. As specifically depicted in FIG. 6, a width 222 of the tab 212 may be approximately 35 mm, and a height 224 of the tab 212 may be approximately 14 mm. One or both sides of the tab 212 may further include identifiers 226 that convey information (e.g., size, type) about one or both of the optical filters 204, 206 within the filter assembly 200. In some implementations, the shape or color of the filter identification tab 212 may also identify the properties of the filters contained within the filter assembly 200.

Referring now to FIG. 8, the attachment assembly 300 is depicted. As described above, the attachment assembly 300 is shown to include a generally square attachment frame 302 with coupling magnets 306 embedded in each of the chamfered corners of the frame 302. The attachment assembly 300 may be coupled to a camera via a threaded adapter 304. In some implementations, an additional optical filter (not shown) may be mounted in the attachment frame 302.

Figure 7:
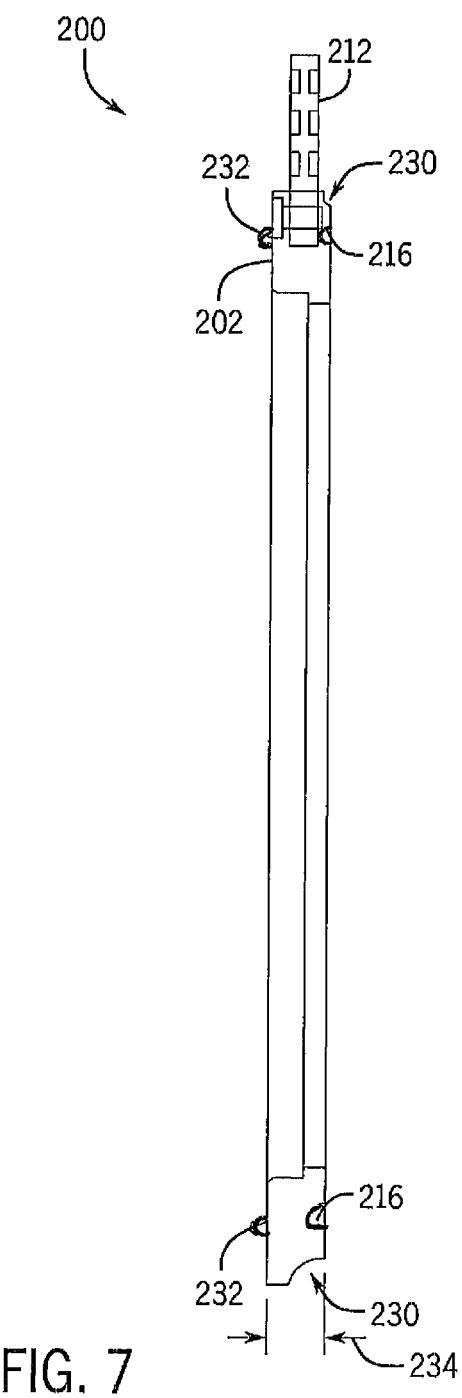
FIG. 7 is a side cross-sectional view of the dual rotation magnetic filter assembly of FIG. 6.

As best shown in FIGS. 3, 5, and 7 each of the filter assembly 200 and the attachment assembly 300 are respectively shown to include filleted surfaces 230 and 310 that respectively extend around the perimeters of the filter frame 202 and attachment frame 302 and face each other when the filter assembly 200 is coupled to the attachment assembly 300. The presence of the facing filleted surfaces 230 and 310 may prevent pinching of an operator's fingers when coupling the filter assembly 200 to the attachment assembly 300 by forming a gap region 1000 about the perimeters of the filter frame 202 and the attachment frame 302. Proper centering of the filter assembly 200 relative to the attachment assembly 300 may be achieved by mating a ring element 308 extending from the attachment frame 302 into a ring recess 216 formed in the filter frame 202. The coupling of the ring element 308 and the ring recess 216 may also prevent light leakage that would degrade the operation of the filter assembly 200. In some embodiments, the filter frame 202 further includes a ring element 252 positioned opposite the ring recess 216 to facilitate the positioning and coupling of another filter assembly to the filter assembly 200.

In some implementations, the attachment assembly 300 may be provided in separable components, for example, the threaded adapter 304 may be separable from the attachment frame 302 such that the threaded adapter 304 is first threadably coupled to the camera, and the attachment frame 302 is subsequently coupled to the threaded adapter 304 via any suitable method (e.g., snap fit features, fasteners, etc.). In such implementations, the orientation of the attachment frame 302 relative to the threaded adapter 304 may be secured by a set screw or a thumb screw 312 that extends through the frame 302 and butts up against the threaded adapter 304 to ensure that the attachment assembly 300 is positioned squarely relative to the camera.

Figure 10:
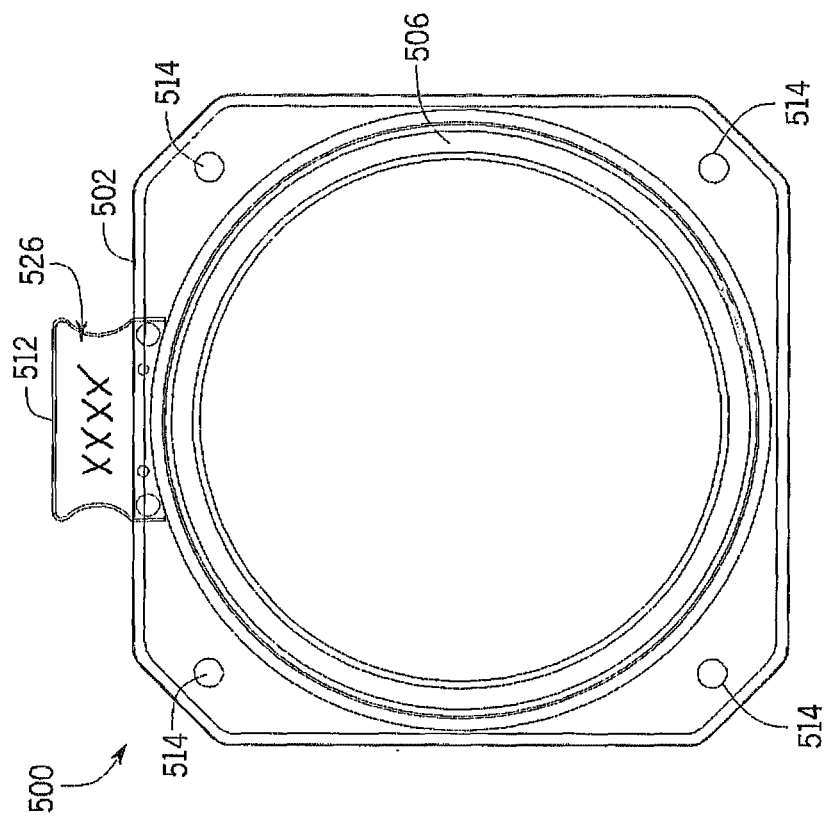
FIG. 10 is a rear view of a stationary magnetic filter assembly according to yet another exemplary implementation of the present disclosure.
Figure 9:
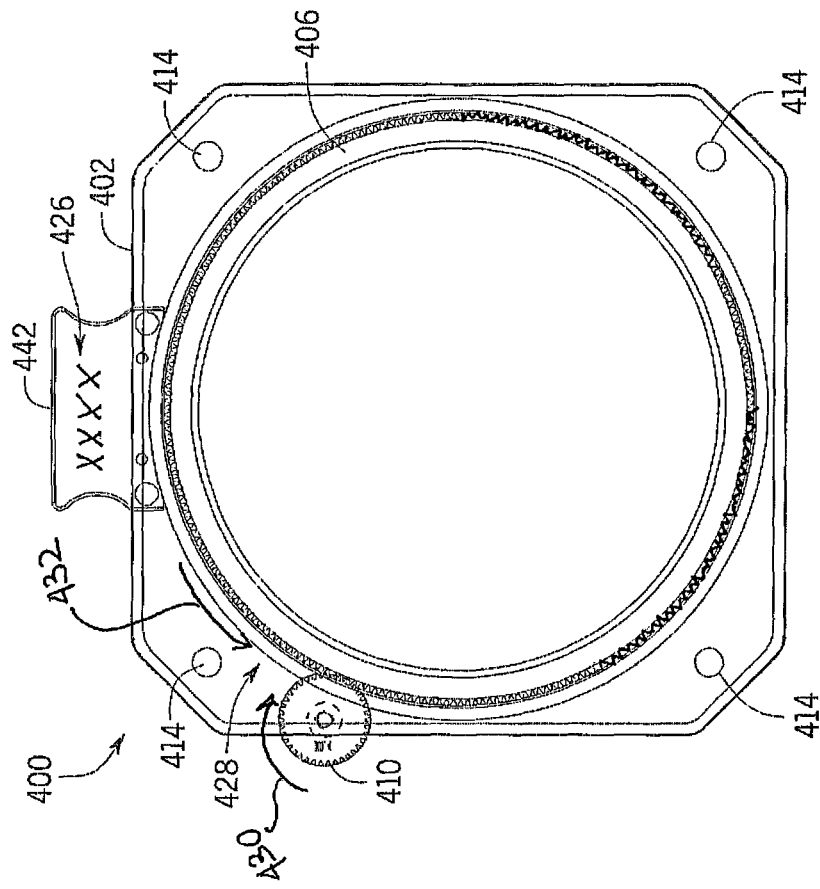
FIG. 9 is a rear view of a single rotation magnetic filter assembly according to another exemplary implementation of the present disclosure.

Turning now to FIGS. 9 and 10, alternative embodiment filter assemblies 400, 500 are depicted. Specifically, FIG. 9 depicts a single rotation filter assembly 400 and FIG. 10 depicts a stationary filter assembly 500. Either of the assemblies 400, 500 may be used in place of the filter assembly 200, and thus both of the assemblies 400, 500 include many of the same features of the filter assembly 200. For example, the filter frames 402, 502, coupling magnets 414, 514, filter identification tab 412, 512, and identifiers 426, 526 are all identical or substantially similar to the filter frame 202, coupling magnets 214, filter identification tab 212, and identifier 226 described above with reference to filter assembly 200.

In contrast to the filter assembly 200, FIG. 9 depicts the filter assembly 400 as including a spur gear 410 that interacts with external teeth 428 of an optical filter 406 such that rotation of the spur gear 410 according to the arrow 430 rotates the optical filter 406 per the arrow 432 relative to the filter frame 402. In some implementations, the filter assembly 400 includes only a single optical filter 406. In other implementations, the filter assembly 400 includes a rotatable filter 406 and an additional stationary or static filter (not shown). FIG. 10 depicts filter assembly 500 with a stationary (i.e., non-rotating) filter 506. In various implementations, the filter 506 is retained in the frame 502 using an adhesive or a retaining ring. In still further implementations, filter assembly 500 includes both the filter 506 and an additional stationary filter (not shown).

In the present disclosure, certain terms have been used for brevity, clarity, and understanding. No unnecessary limitations are to be implied therefrom beyond the requirement of the prior art because such terms are used for descriptive purposes only and are intended to be broadly construed. The different systems and methods described herein may be used alone or in combination with other systems and devices. Various equivalents, alternatives and modifications are possible within the scope of the appended claims.

What is claimed is:

1. An optical filter attachment assembly for a camera, comprising:
    an attachment assembly configured to be threadably coupled to the camera and comprising an attachment frame, wherein the attachment frame comprises a first plurality of magnets; and
    at least one filter assembly, each filter assembly comprising a plurality of optical filters mounted in a filter frame, wherein the filter frame comprises a second plurality of magnets;
    wherein the first plurality of magnets and the second plurality of magnets are configured to detachably couple to each other at one of a plurality of discrete orientations such that the at least one optical filter is retained on the camera, and
    wherein at least one of the plurality of optical filters is configured to rotate relative to the filter frame.

2. The optical filter attachment assembly of claim 1, wherein the at least one filter assembly comprises a plurality of filter assemblies.

3. The optical filter attachment assembly of claim 1, wherein the plurality of optical filters comprises a pair of optical filters.

4. The optical filter attachment assembly of claim 3, wherein a first optical filter in the pair of optical filters is fixed relative to the filter frame, and wherein a second optical filter in the pair of optical filters is configured to rotate relative to the filter frame and the first optical filter.

5. The optical filter attachment assembly of claim 3, wherein a first optical filter in the pair of optical filters is configured to rotate relative to the filter frame, and wherein a second optical filter in the pair of optical filters is configured to rotate relative to the filter frame and the first optical filter.

6. The optical filter attachment assembly of claim 1, wherein:
the at least one optical filter configured to rotate relative to the filter frame comprises a plurality of external teeth extending around at least a portion of the perimeter of the at least one optical filter; and
the at least one filter assembly further comprises at least one spur gear configured to couple to the plurality of external teeth such that rotation of the at least one spur gear causes rotation of the at least one optical filter relative to the filter frame.

7. The optical filter attachment assembly of claim 6, wherein the at least one optical filter is configured to rotate 360° relative to the filter frame.

8. The optical filter attachment assembly of claim 6, wherein the at least one optical filter is configured to rotate an amount less than 360° relative to the filter frame.

9. The optical filter attachment assembly of claim 1, wherein the at least one filter assembly further comprises a filter identification tab extending from the filter frame, the filter identification tab comprising identifying characteristics of the at least one optical fiber.

10. The optical filter attachment assembly of claim 1, wherein a magnetic strength of the first plurality of magnets is greater than a magnetic strength of the second plurality of magnets.

11. A filter assembly used in an optical filter attachment assembly for a camera, the filter assembly comprising:
a filter frame;
a plurality of optical filters mounted in the filter frame; and
a first plurality of magnets mounted in a first pattern in the filter frame;
wherein the first plurality of magnets are configured to detachably couple at one of a plurality of discrete orientations to a second plurality of magnets mounted in an attachment assembly that is threadably coupled to the camera, and
wherein at least one of the plurality of optical filters is configured to rotate relative to the filter frame.

12. The filter assembly of claim 11, wherein the plurality of optical filters comprises a pair of optical filters.

13. The filter assembly of claim 12, wherein a first optical filter in the pair of optical filters is fixed relative to the filter frame, and wherein a second optical filter in the pair of optical filters is configured to rotate relative to the filter frame and the first optical filter.

14. The filter assembly of claim 12, wherein a first optical filter in the pair of optical filters is configured to rotate relative to the filter frame, and wherein a second optical filter in the pair of optical filters is configured to rotate relative to the filter frame and the first optical filter.

15. The filter assembly of claim 11, wherein:
the at least one optical filter configured to rotate relative to the filter frame comprises a plurality of external teeth extending around at least a portion of the perimeter of the at least one optical filter; and
the filter assembly further comprises at least one spur gear configured to couple to the plurality of external teeth such that rotation of the at least one spur gear causes rotation of the at least one optical filter relative to the filter frame.

16. The filter assembly of claim 15, wherein the at least one optical filter is configured to rotate 360° relative to the filter frame.

17. The filter assembly of claim 15, wherein the at least one optical filter is configured to rotate an amount less than 360° relative to the filter frame.

18. The filter assembly of claim 11, further comprising a filter identification tab extending from the filter frame, the filter identification tab comprising identifying characteristics of the at least one optical fiber.

* * * * *